Patented June 17, 1941

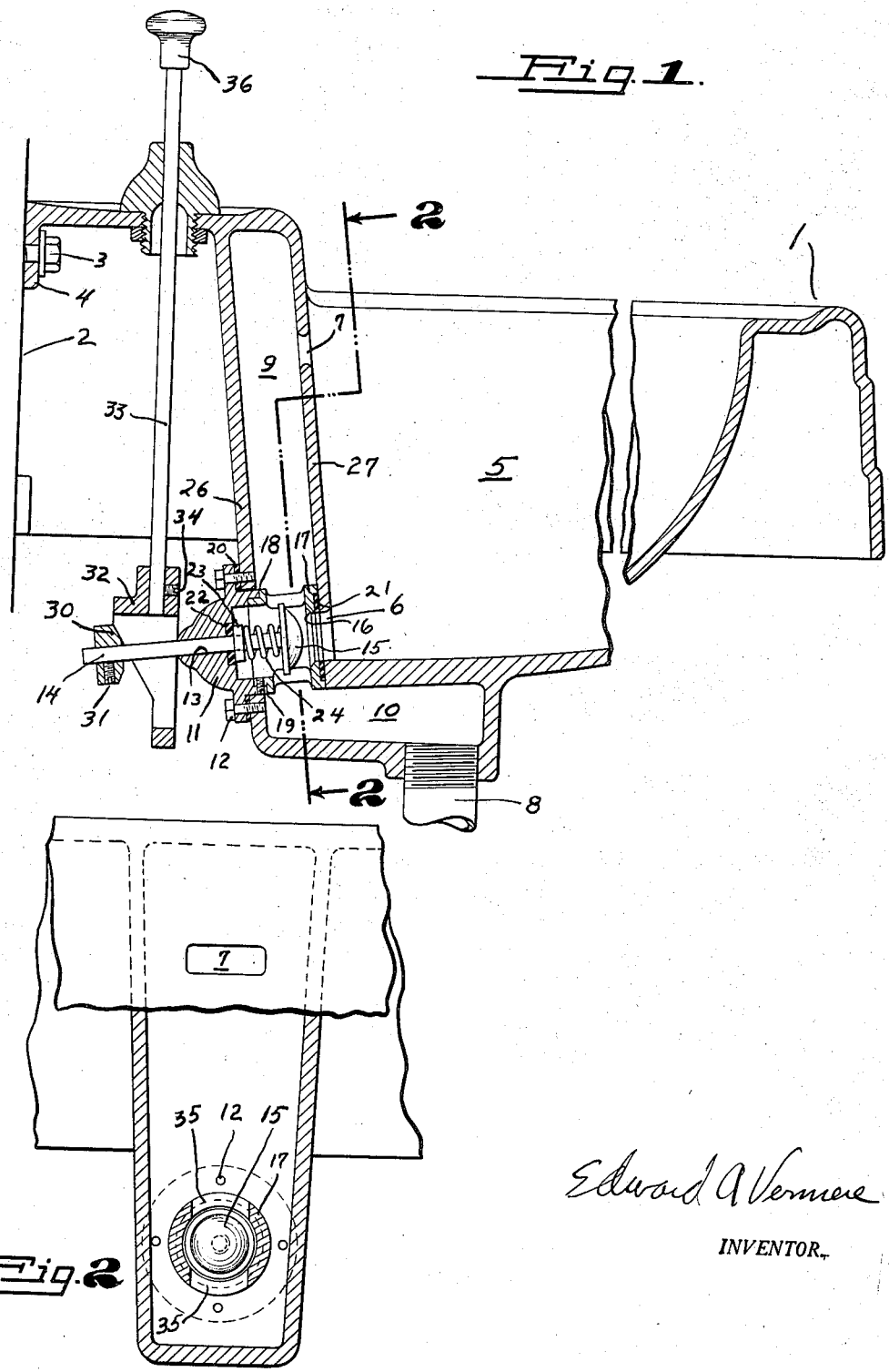

2,245,946

UNITED STATES PATENT OFFICE 2,245,946

WASTE SYSTEM

Edward A. Vermere, Los Angeles, Calif.

Application June 21, 1939, Serial No. 280,223

9 Claims. (Cl. 4—203)

This invention relates to waste systems for wash basins, bath tubs, and other liquid receptacles. The principal advantage of my invention lies in economy of its manufacture. Other advantages lie in simplicity of construction, installation, operation, and maintenance, as well as in the positiveness and efficiency of action.

The principal object of my invention is to provide a waste system which is efficient and inexpensive. Another object is to provide a waste valve which is positive, yet simple in action. Another object is to provide a waste valve which can be withdrawn outwards from a waste outlet of a bowl so as to aid the rapid flow of liquid into a waste line.

Other objects and advantages of my invention will be apparent or will be specifically pointed out in the description forming a part of this specification, but I do not limit myself to the embodiment of the invention herein described, as various forms may be adopted within the scope of the appended claims.

Referring to the drawing:

Fig. 1 is a vertical section of a preferred embodiment of my waste system.

Fig. 2 is a front view of my invention partly in section taken along the line 2—2 of Fig. 1.

Fig. 1 shows a wash basin 1 secured to a wall 2 by any suitable means such as screws 3 through bracket arm 4 on the back of said basin. In the bottom of wash bowl 5 is a waste outlet 6 and at a higher point is an overflow outlet 7, both of which connect to a waste pipe 8 through the overflow channel 9 and waste channel 10.

To the rear wall 26 of channel 9 opposite outlet 6 and at about the same level a valve guide 11 is secured by screws 12 or by other means. Valve guide 11 has a guide bore 13 adapted to hold a valve shaft 14 and valve head 15 in alignment with said outlet 6 within channel 10. Valve head 15 is adapted to fit a complementary seal or valve seat 16 at outlet 6 and to control the flow of liquid through said outlet 6.

In the preferred form of my invention said valve head 15 is adapted to reciprocate within a valve housing formed by valve guide 11 and valve seal cylinder 17. Said cylinder 17 telescopes with guide 11 by means of an inset joint 18 and may be secured to said guide by means of a set screw 19, thus providing for replacement of valve seal cylinder 17 by a valve seal cylinder of a different length.

The valve guide 11 and valve seal cylinder 17 are so dimensioned with regard to the spacing of walls 26 and 27 that they respectively hold gaskets 20 and 21 tightly against the rear of corresponding walls 26 and 27.

Said valve head 15 and the valve seal cylinder 17 are preferably made of brass or are die cast.

Within a countersunk bore at the channel end of said guide bore 13 is a ring gasket 22, preferably made of a flexible water-proof material such as rubber. A compression spring 24 is mounted concentric with shaft 14 between valve 15 and a metal washer 23 in contact with gasket 22.

Said spring 24 performs two main functions. It presses valve 15 against valve seat 16 to produce a water-tight seal at outlet 6 and simultaneously applies a force to gasket 22 so as to produce a water-tight seal between guide 11 and shaft 14. The force of spring 24 on gasket 22 is substantially equalized throughout the surface by means of the solid washer 23 through which the spring force is applied to said flexible gasket 22.

Flow of water through outlet 6 may be prevented or not by closing or opening waste outlet 6 with valve head 15. I use a plunger with plunger rod 33 and plunger handle 36 external to channels 9 and 10 for controlling the action of valve 15.

An adjustable cam follower 30, preferably annular, is secured to shaft 14 by set screw 31. A slotted cam 32 secured to a plunger rod 33 by set screw 34 encloses shaft 14 and is adapted to cooperate with cam guide 30 in such a manner that valve 15 is reciprocated horizontally by a vertically reciprocating force applied to the plunger. In the upper position of the plunger, valve head 15 engages a valve seat 16 at outlet 6 to close outlet 6 and thereby retain water in bowl 5. In the lower position of the plunger, valve head 15 is withdrawn from outlet 6 and allows water from bowl 5 to flow through outlet 6 and channel 10 into waste line 8.

It will be observed that in the open position of valve head 15 the flow of water from bowl 5 to the waste line 8 is aided by the fact that there is an unobstructed passage from the bowl to the waste line.

From Fig. 2 it will be noticed that any water passing out the overflow port 7 is always free to flow to the waste channel 10 through overflow channel 9, around the valve seal cylinder 17 or through the vertical passages 35, 35 therein.

In constructing my waste valve system I prefer to proportion the strength of spring 24 with regard to the geometry and weights of the various elements so as to assure proper action of the system in both the open and closed positions. Thus, for example, for the shapes of cams 30 and 32 as shown spring 24 is made strong enough to keep outlet 6 permanently closed when desired, without the danger of the weight of the plunger, cam, etc. pulling valve 15 away from the valve seat; and weak enough so that the weight of the plunger, cam, etc. will hold the valve system in the open position when once set there.

Thus, it is seen that my invention provides a simple, efficient and inexpensive waste control, positive in action, and self-adjusting at the valve seal.

I claim:

1. A liquid receptacle having, in combination a waste outlet, a waste channel connecting said waste outlet to a waste line and having a valve head within said channel opposite said outlet, a valve shaft extending through a bore in a wall of said channel, means within said channel normally urging said valve head against a valve seat at said outlet, means for maintaining a liquid-tight seal between said shaft and said bore, external means cooperating with said shaft for opening or closing said outlet by disengaging or engaging said valve head with a valve seat at said outlet.

2. A liquid receptacle having, in combination a waste outlet, a waste channel connecting said waste outlet to a waste line and having a valve head within said channel opposite said outlet, a valve shaft extending through a bore in a wall of said channel, a compression spring concentric with said shaft within said channel for exerting a force on said valve head toward said outlet and simultaneously maintaining a liquid-tight seal between said shaft and said bore, external control means associated with said shaft for opening or closing said outlet by disengaging or engaging said valve head with a valve seat at said outlet.

3. A liquid receptacle having, in combination a waste outlet, a waste channel connecting said waste outlet to a waste line and having opposite said outlet a passage through a wall of said channel, a valve head within said channel, a valve shaft extending through said passage, means within said channel for exerting a force on said valve head toward said outlet, means external to said channel associated with said shaft for opening or closing said outlet by disengaging or engaging said valve head with a valve seat at said outlet.

4. A waste control system for a lavatory having a bowl, a discharge outlet at the bottom of said bowl, a valve chamber communicating with said outlet, and a waste line communicating with said chamber, which comprises a valve seat within said chamber at said bowl outlet, a valve shaft extending through a bore in a wall of said chamber, a valve head within said chamber and secured to said shaft, a helical spring concentric with said shaft, a compressible gasket concentric with said shaft and in contact with said chamber wall at said bore, said spring being adapted to normally urge said valve head against said seat to close said outlet and to simultaneously compress said gasket against said wall and said shaft so as to maintain a water tight seal at said bore, and external control means connected to said shaft adapted to reciprocate said valve within said chamber to open and close said outlet.

5. A lavatory comprising a bowl having a discharge outlet at the bottom of a side wall thereof, a valve chamber communicating with said bowl through said outlet, a waste line communicating with said chamber, a valve seat within said chamber at said bowl outlet, a valve shaft extending substantially horizontally through a bore in a wall of said chamber opposite said outlet, a valve head within said chamber secured to said shaft, means within said chamber normally urging said valve head against said valve seat, sealing means adapted to maintain a water tight seal between said shaft and said bore, and control means external to said chamber cooperating with said shaft and adapted to reciprocate said valve within said chamber so as to open and close said outlet.

6. A valve for a waste system comprising a cylindrical body having a coaxially concentric chamber therein, an inlet port at one end of said body, a valve shaft bore at the opposite end of said body, and flow passages on opposite sides of said body; a valve seat at said inlet port within said chamber; a valve shaft extending through said bore into said chamber; and a valve head on said shaft within said chamber adapted to close said inlet by engagement with said seat.

7. A valve for a waste control system comprising a valve body having a valve chamber therein, an inlet port in said body at one end of said chamber, a valve shaft bore at the opposite end of said chamber, and an outlet port in said body at one side of said chamber; a valve seat at said inlet port within said chamber; a valve shaft extending through said bore into said chamber, a valve head on said shaft within said chamber and adapted to close said inlet by engagement with said seat; and a helical spring concentric with said valve shaft, said spring contacting said valve head and being adapted to normally urge said valve head against said valve seat to positively close said inlet port.

8. A valve for a waste control system comprising a valve body having a valve chamber therein, an inlet port in said body at one end of said chamber, a valve shaft bore at the opposite end of said chamber, and an outlet port in said body at one side of said chamber; a valve seat at said inlet port within said chamber; a valve shaft extending through said bore into said chamber, a valve head on said shaft within said chamber and adapted to close said inlet by engagement with said seat; and a helical spring and a compressible gasket, both said spring and said gasket being concentric with said shaft within said chamber, said spring being adapted to normally urge said valve head against said valve seat to close said inlet port and to simultaneously press said gasket against the wall of said chamber and said shaft to maintain a liquid tight seal at said bore.

9. A valve for a waste control system comprising a valve body having a valve chamber therein, an inlet port in said body at one end of said chamber, a valve shaft bore at the opposite end of said chamber, and an outlet port in said body at one side of said chamber; a valve seat at said inlet port within said chamber; a valve shaft extending through said bore into said chamber, a valve head on said shaft within said chamber and adapted to close said inlet by engagement with said seat; a helical spring concentric with said shaft; a compressible gasket concentric with said shaft and in contact with the chamber wall adjacent said bore; and a rigid washer concentric with said shaft located between said gasket and said spring; said spring, said gasket, and said washer being within said chamber; and said spring being adapted to normally urge said valve head against said valve seat to close said inlet port and to simultaneously press said gasket against said wall and said shaft to maintain a liquid tight seal at said bore.

EDWARD A. VERMERE.